US010747638B2

(12) United States Patent
Rose

(10) Patent No.: US 10,747,638 B2
(45) Date of Patent: Aug. 18, 2020

(54) COMPUTING MEMORY HEALTH METRICS

(71) Applicant: Oracle International Corporation, Redwood Shores, CA (US)

(72) Inventor: John Robert Rose, San Jose, CA (US)

(73) Assignee: Oracle International Corporation, Redwood Shores, CA (US)

(*) Notice: Subject to any disclaimer, the term of this patent is extended or adjusted under 35 U.S.C. 154(b) by 205 days.

(21) Appl. No.: 15/956,167

(22) Filed: Apr. 18, 2018

(65) Prior Publication Data
US 2019/0324880 A1 Oct. 24, 2019

(51) Int. Cl.
*G06F 11/00* (2006.01)
*G06F 11/32* (2006.01)
*G06F 11/30* (2006.01)
*G06F 9/455* (2018.01)

(52) U.S. Cl.
CPC ........ *G06F 11/327* (2013.01); *G06F 9/45533* (2013.01); *G06F 11/3037* (2013.01); *G06F 11/3072* (2013.01); *G06F 2009/45583* (2013.01)

(58) Field of Classification Search
CPC ............. G06F 11/0754; G06F 11/3037; G06F 11/3072; G06F 11/327
See application file for complete search history.

(56) References Cited

U.S. PATENT DOCUMENTS

| | | | | |
|---|---|---|---|---|
| 6,587,057 B2* | 7/2003 | Scheuermann | ....... | H03M 7/425 341/67 |
| 7,188,227 B2* | 3/2007 | Luick | ..................... | G06F 12/04 711/171 |
| 8,533,564 B2* | 9/2013 | Yurzola | ............... | G06F 11/1048 714/763 |
| 8,539,191 B2* | 9/2013 | Pawar | .................. | G06F 3/0608 711/170 |
| 9,002,913 B2* | 4/2015 | Portell I De Mora | | ...................... H03M 7/4056 708/200 |
| 9,037,779 B2* | 5/2015 | Dror | .................. | G06F 12/0246 711/103 |
| 9,332,090 B1* | 5/2016 | Fallows | .................. | H04L 67/02 |
| 9,659,383 B2* | 5/2017 | Bono | ........................ | G06T 9/00 |
| 9,769,477 B2* | 9/2017 | Fallon | ..................... | H03M 7/30 |
| 10,013,200 B1* | 7/2018 | Shveidel | ............... | G06F 3/0638 |
| 10,437,781 B2* | 10/2019 | Patthak | ............... | H03M 7/3088 |
| 10,467,102 B1* | 11/2019 | Baruch | ............... | H04L 67/1097 |
| 2006/0075132 A1* | 4/2006 | Liu | .................. | H04L 29/06027 709/236 |
| 2008/0279462 A1* | 11/2008 | Celi, Jr. | ............. | H04L 67/1095 382/232 |
| 2016/0188212 A1* | 6/2016 | Camp | ..................... | G06F 3/064 |
| 2017/0161348 A1* | 6/2017 | Araki | .................. | G06F 11/1448 |
| 2017/0207986 A1* | 7/2017 | Sundaram | ........... | G06F 16/1744 |

(Continued)

*Primary Examiner* — Elmira Mehrmanesh
(74) *Attorney, Agent, or Firm* — Invoke

(57) ABSTRACT

Techniques for computing a memory health metric are disclosed. A system computes a memory health metric as a function of estimated entropy in a data set. The system may determine the memory health metric based on compressed and uncompressed sizes of the data set, quantities of values in the data set, and/or patterns of structural relationships within the data set. The system determines whether the memory health metric crosses a threshold value. If the memory health metric crosses the threshold value, the system presents a warning indicating that utilization of the memory is unhealthy.

17 Claims, 11 Drawing Sheets

(56) References Cited

U.S. PATENT DOCUMENTS

2018/0101332 A1\* 4/2018 Huff ................ G06F 3/064
2018/0375527 A1\* 12/2018 Gopal ............... H03M 7/6005

\* cited by examiner

COMPUTING MEMORY HEALTH METRICS

TECHNICAL FIELD

The present disclosure relates to computer memory. In particular, the present disclosure relates to analyzing computer memory.

BACKGROUND

A computer system may use memory more or less efficiently. In general, a computer system uses memory more efficiently where there is a smaller ratio of overhead to payload data. The computer system uses memory less efficiently as the ratio of overhead to payload data increases. Payload data is useful data that is not merely structural. Overhead may take many different forms. Examples of overhead include, but are not limited to: structural overhead; padding; and unutilized fields.

As an example of structural overhead, consider an object myObject that is an instance of a class MyClass, i.e., an object of type MyClass. The object myObject includes a field myBoolean declared as a boolean primitive type. The value of the field myBoolean is payload data. The object myObject has associated structural overhead, including an object header that stores metadata such as the object's class, a unique identifier, status flags indicating whether the object is reachable and/or locked, etc. As the number of objects of type MyClass increases, the structural overhead that occupies memory also increases.

As an example of padding, consider multiple objects of type MyClass. A runtime environment may allocate memory for objects only in 8-byte increments. If the structural overhead and payload of each object of type MyClass occupies 7 bytes, then 1 byte of adjacent memory ("padding") also will be occupied to store each object. As the number of objects of type MyClass increases, the padding that occupies memory also increases.

As an example of unutilized fields, consider a field myBoolean that is declared at runtime. The field (and any associated structural overhead and padding) occupies memory. However, if the field myBoolean is never used at runtime, that memory may be considered wasted. The field myBoolean may itself be viewed as overhead rather than payload.

Overhead may degrade a computer system's performance. If there is not enough memory to satisfy all the overhead along with other memory needs, the computer system may slow due to paging. In a cloud system with multiple tenants, a tenant with significant overhead may exceed its memory allotment. The cloud system may automatically provision more memory for the tenant, reducing memory available to other tenants. Additional provisioning may also incur additional hosting costs for the tenant. If multiple tenants exceed their memory allotments, the cloud system operator may incur costs (in time and money) expanding the cloud system's available resources.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW
2.1 EXAMPLE CLASS FILE STRUCTURE
2.2 EXAMPLE VIRTUAL MACHINE ARCHITECTURE
2.3 LOADING, LINKING, AND INITIALIZING
2.4 VIRTUAL MACHINE ANALYSIS ENGINE AND NETWORK MANAGER
3. MEMORY HEALTH METRICS
3.1 GENERATING A MEMORY HEALTH METRIC
3.2 MEMORY HEALTH METRICS BASED ON COMPRESSIBILITY
3.3 MEMORY HEALTH METRICS BASED ON VALUE QUANTITIES
3.4 MEMORY HEALTH METRICS BASED ON STRUCTURAL RELATIONSHIPS
4. ILLUSTRATIVE EXAMPLES
5. MISCELLANEOUS; EXTENSIONS
6. HARDWARE OVERVIEW
7. COMPUTER NETWORKS AND CLOUD NETWORKS
8. MICROSERVICE APPLICATIONS

1. General Overview

One or more embodiments include techniques for generating a memory health metric, to determine whether memory is being used efficiently. A system computes the memory health metric as a function of estimated entropy in a data set, providing an approximation of how much of the data set is payload data. The system may determine the memory health metric, for example, based on compressed and uncompressed sizes of the data set, based on quantities of values in the data set, and/or based on patterns of structural relationships within the data set. The system determines whether the memory health metric crosses a threshold value. If the memory health metric crosses the threshold value, the system presents a warning indicating that utilization of the memory is unhealthy.

One or more embodiments described in this Specification and/or recited in the claims may not be included in this General Overview section.

2. Architectural Overview

Figure 1:
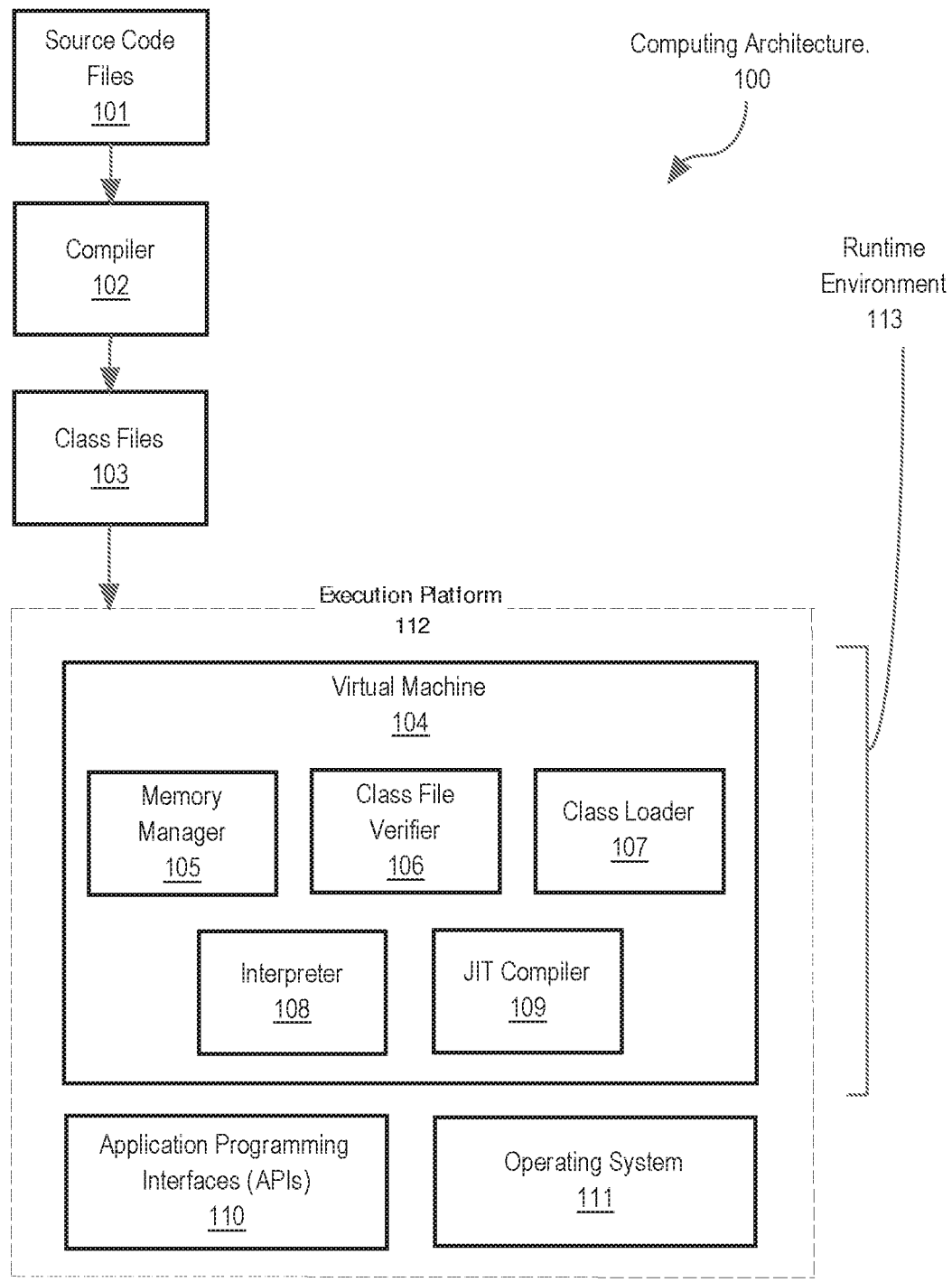
FIG. 1 illustrates an example computing architecture in which techniques described herein may be practiced.

FIG. 1 illustrates an example architecture in which techniques described herein may be practiced. Software and/or hardware components described with relation to the example architecture may be omitted or associated with a different set of functionality than described herein. Software and/or hardware components, not described herein, may be used within an environment in accordance with one or more embodiments. Accordingly, the example environment should not be constructed as limiting the scope of any of the claims.

As illustrated in FIG. 1, a computing architecture 100 includes source code files 101 which are compiled by a compiler 102 into class files 103 representing the program to be executed. The class files 103 are then loaded and executed by an execution platform 112, which includes a runtime environment 113, an operating system 111, and one or more application programming interfaces (APIs) 110 that enable communication between the runtime environment 113 and the operating system 111. The runtime environment 113 includes a virtual machine 104 comprising various components, such as a memory manager 105 (which may include a garbage collector), a class file verifier 106 to check the validity of class files 103, a class loader 107 to locate and build in-memory representations of classes, an interpreter 108 for executing the virtual machine 104 code, and a just-in-time (JIT) compiler 109 for producing optimized machine-level code.

In an embodiment, the computing architecture 100 includes source code files 101 that contain code that has been written in a particular programming language, such as Java, C, C++, C#, Ruby, Perl, and so forth. Thus, the source code files 101 adhere to a particular set of syntactic and/or semantic rules for the associated language. For example, code written in Java adheres to the Java Language Specification. However, since specifications are updated and revised over time, the source code files 101 may be associated with a version number indicating the revision of the specification to which the source code files 101 adhere. The exact programming language used to write the source code files 101 is generally not critical.

In various embodiments, the compiler 102 converts the source code, which is written according to a specification directed to the convenience of the programmer, to either machine or object code, which is executable directly by the particular machine environment, or an intermediate representation ("virtual machine code/instructions"), such as bytecode, which is executable by a virtual machine 104 that is capable of running on top of a variety of particular machine environments. The virtual machine instructions are executable by the virtual machine 104 in a more direct and efficient manner than the source code. Converting source code to virtual machine instructions includes mapping source code functionality from the language to virtual machine functionality that utilizes underlying resources, such as data structures. Often, functionality that is presented in simple terms via source code by the programmer is converted into more complex steps that map more directly to the instruction set supported by the underlying hardware on which the virtual machine 104 resides.

In general, programs are executed either as a compiled or an interpreted program. When a program is compiled, the code is transformed globally from a first language to a second language before execution. Since the work of transforming the code is performed ahead of time; compiled code tends to have excellent run-time performance. In addition, since the transformation occurs globally before execution, the code can be analyzed and optimized using techniques such as constant folding, dead code elimination, inlining, and so forth. However, depending on the program being executed, the startup time can be significant. In addition, inserting new code would require the program to be taken offline, re-compiled, and re-executed. For many dynamic languages (such as Java) which are designed to allow code to be inserted during the program's execution, a purely compiled approach may be inappropriate. When a program is interpreted, the code of the program is read line-by-line and converted to machine-level instructions while the program is executing. As a result, the program has a short startup time (can begin executing almost immediately), but the run-time performance is diminished by performing the transformation on the fly. Furthermore, since each instruction is analyzed individually, many optimizations that rely on a more global analysis of the program cannot be performed.

In some embodiments, the virtual machine 104 includes an interpreter 108 and a JIT compiler 109 (or a component implementing aspects of both), and executes programs using a combination of interpreted and compiled techniques. For example, the virtual machine 104 may initially begin by interpreting the virtual machine instructions representing the program via the interpreter 108 while tracking statistics related to program behavior, such as how often different sections or blocks of code are executed by the virtual machine 104. Once a block of code surpasses a threshold (is "hot"), the virtual machine 104 invokes the JIT compiler 109 to perform an analysis of the block and generate optimized machine-level instructions which replaces the "hot" block of code for future executions. Since programs tend to spend most time executing a small portion of overall code, compiling just the "hot" portions of the program can provide similar performance to fully compiled code, but without the start-up penalty. Furthermore, although the optimization analysis is constrained to the "hot" block being replaced, there still exists far greater optimization potential than converting each instruction individually. There are a number of variations on the above described example, such as tiered compiling.

In order to provide clear examples, the source code files 101 have been illustrated as the "top level" representation of the program to be executed by the execution platform 112. Although the computing architecture 100 depicts the source code files 101 as a "top level" program representation, in other embodiments the source code files 101 may be an intermediate representation received via a "higher level" compiler that processed code files in a different language into the language of the source code files 101. Some examples in the following disclosure assume that the source code files 101 adhere to a class-based object-oriented programming language. However, this is not a requirement to utilizing the features described herein.

In an embodiment, compiler 102 receives as input the source code files 101 and converts the source code files 101 into class files 103 that are in a format expected by the virtual machine 104. For example, in the context of the JVM, the Java Virtual Machine Specification defines a particular class file format to which the class files 103 are expected to adhere. In some embodiments, the class files 103 contain the virtual machine instructions that have been converted from the source code files 101. However, in other embodiments, the class files 103 may contain other structures as well, such as tables identifying constant values and/or metadata related to various structures (classes, fields, methods, and so forth).

The following discussion assumes that each of the class files 103 represents a respective "class" defined in the source code files 101 (or dynamically generated by the compiler 102/virtual machine 104). However, the aforementioned assumption is not a strict requirement and will depend on the implementation of the virtual machine 104. Thus, the techniques described herein may still be performed regardless of the exact format of the class files 103. In some embodiments, the class files 103 are divided into one or more "libraries" or "packages", each of which includes a collection of classes that provide related functionality. For example, a library may contain one or more class files that implement input/output (I/O) operations, mathematics tools, cryptographic techniques, graphics utilities, and so forth. Further, some classes (or fields/methods within those classes) may include access restrictions that limit their use to within a particular class/library/package or to classes with appropriate permissions.

2.1 Example Class File Structure

Figure 2:
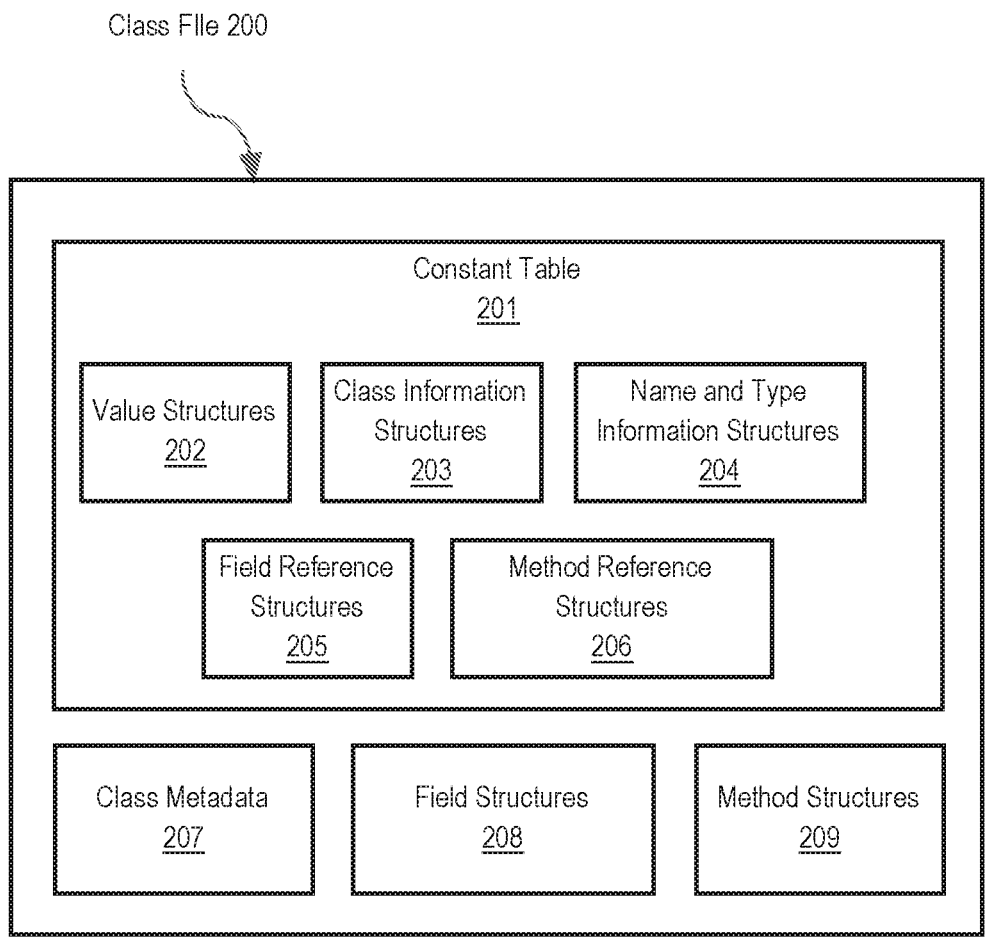
FIG. 2 is a block diagram illustrating an embodiment of a computer system suitable for implementing methods and features described herein.

FIG. 2 illustrates an example structure for a class file 200 in block diagram form according to an embodiment. In order to provide clear examples, the remainder of the disclosure assumes that the class files 103 of the computing architecture 100 adhere to the structure of the example class file 200 described in this section. However, in a practical environment, the structure of the class file 200 will be dependent on the implementation of the virtual machine 104. Further, one or more features discussed herein may modify the structure of the class file 200 to, for example, add additional structure types. Therefore, the exact structure of the class file 200 is not critical to the techniques described herein. For the purposes of Section 2.1, "the class" or "the present class" refers to the class represented by the class file 200.

In FIG. 2, the class file 200 includes a constant table 201, field structures 208, class metadata 207, and method structures 209. In an embodiment, the constant table 201 is a data structure which, among other functions, acts as a symbol table for the class. For example, the constant table 201 may store data related to the various identifiers used in the source code files 101 such as type, scope, contents, and/or location. The constant table 201 has entries for value structures 202 (representing constant values of type int, long, double, float, byte, string, and so forth), class information structures 203, name and type information structures 204, field reference structures 205, and method reference structures 206 derived from the source code files 101 by the compiler 102. In an embodiment, the constant table 201 is implemented as an array that maps an index i to structure j. However, the exact implementation of the constant table 201 is not critical.

In some embodiments, the entries of the constant table 201 include structures which index other constant table 201 entries. For example, an entry for one of the value structures 202 representing a string may hold a tag identifying its "type" as string and an index to one or more other value structures 202 of the constant table 201 storing char, byte or int values representing the ASCII characters of the string.

In an embodiment, field reference structures 205 of the constant table 201 hold an index into the constant table 201 to one of the class information structures 203 representing the class defining the field and an index into the constant table 201 to one of the name and type information structures 204 that provides the name and descriptor of the field. Method reference structures 206 of the constant table 201 hold an index into the constant table 201 to one of the class information structures 203 representing the class defining the method and an index into the constant table 201 to one of the name and type information structures 204 that provides the name and descriptor for the method. The class information structures 203 hold an index into the constant table 201 to one of the value structures 202 holding the name of the associated class.

The name and type information structures 204 hold an index into the constant table 201 to one of the value structures 202 storing the name of the field/method and an index into the constant table 201 to one of the value structures 202 storing the descriptor.

In an embodiment, class metadata 207 includes metadata for the class, such as version number(s), number of entries in the constant pool, number of fields, number of methods, access flags (whether the class is public, private, final, abstract, etc.), an index to one of the class information structures 203 of the constant table 201 that identifies the present class, an index to one of the class information structures 203 of the constant table 201 that identifies the superclass (if any), and so forth.

In an embodiment, the field structures 208 represent a set of structures that identifies the various fields of the class. The field structures 208 store, for each field of the class, accessor flags for the field (whether the field is static, public, private, final, etc.), an index into the constant table 201 to one of the value structures 202 that holds the name of the field, and an index into the constant table 201 to one of the value structures 202 that holds a descriptor of the field.

In an embodiment, the method structures 209 represent a set of structures that identifies the various methods of the class. The method structures 209 store, for each method of the class, accessor flags for the method (e.g. whether the method is static, public, private, synchronized, etc.), an index into the constant table 201 to one of the value structures 202 that holds the name of the method, an index into the constant table 201 to one of the value structures 202 that holds the descriptor of the method, and the virtual machine instructions that correspond to the body of the method as defined in the source code files 101.

In an embodiment, a descriptor represents a type of a field or method. For example, the descriptor may be implemented as a string adhering to a particular syntax. While the exact syntax is not critical, a few examples are described below.

In an example where the descriptor represents a type of the field, the descriptor identifies the type of data held by the field. In an embodiment, a field can hold a basic type, an object, or an array. When a field holds a basic type, the descriptor is a string that identifies the basic type (e.g., "B"=byte, "C"=char, "D"=double, "F"=float, "I"=int, "J"=long int, etc.). When a field holds an object, the descriptor is a string that identifies the class name of the object (e.g. "L ClassName"). "L" in this case indicates a reference, thus "L ClassName" represents a reference to an object of class ClassName. When the field is an array, the descriptor identifies the type held by the array. For example, "[B" indicates an array of bytes, with "[" indicating an array and "B" indicating that the array holds the basic type of byte. However, since arrays can be nested, the descriptor for an array may also indicate the nesting. For example, "[[L ClassName" indicates an array where each index holds an array that holds objects of class ClassName. In some embodiments, the ClassName is fully qualified and includes the simple name of the class, as well as the pathname of the class. For example, the ClassName may indicate where the file is stored in the package, library, or file system hosting the class file 200.

In the case of a method, the descriptor identifies the parameters of the method and the return type of the method. For example, a method descriptor may follow the general form "({ParameterDescriptor}) ReturnDescriptor", where the {ParameterDescriptor} is a list of field descriptors representing the parameters and the ReturnDescriptor is a field descriptor identifying the return type. For instance, the string "V" may be used to represent the void return type. Thus, a method defined in the source code files 101 as "Object m(int I, double d, Thread t) { . . . }" matches the descriptor "(I D L Thread) L Object".

In an embodiment, the virtual machine instructions held in the method structures 209 include operations which reference entries of the constant table 201. Using Java as an example, consider the following class:

```
class A
{
    int add12and13( ) {
        return B.addTwo(12, 13);
    }
}
```

In the above example, the Java method add12and13 is defined in class A, takes no parameters, and returns an integer. The body of method add12and13 calls static method addTwo of class B which takes the constant integer values 12 and 13 as parameters, and returns the result. Thus, in the constant table 201, the compiler 102 includes, among other entries, a method reference structure that corresponds to the call to the method B.addTwo. In Java, a call to a method compiles down to an invoke command in the bytecode of the JVM (in this case invokestatic as addTwo is a static method of class B). The invoke command is provided an index into the constant table 201 corresponding to the method reference structure that identifies the class defining addTwo "B", the name of addTwo "addTwo", and the descriptor of addTwo "(I I)I". For example, assuming the aforementioned method reference is stored at index 4, the bytecode instruction may appear as "invokestatic #4".

Since the constant table 201 refers to classes, methods, and fields symbolically with structures carrying identifying information, rather than direct references to a memory location, the entries of the constant table 201 are referred to as "symbolic references". One reason that symbolic references are utilized for the class files 103 is because, in some embodiments, the compiler 102 is unaware of how and where the classes will be stored once loaded into the runtime environment 113. As will be described in Section 2.3, eventually the run-time representations of the symbolic references are resolved into actual memory addresses by the virtual machine 104 after the referenced classes (and associated structures) have been loaded into the runtime environment and allocated concrete memory locations.

2.2 Example Virtual Machine Architecture

Figure 3:
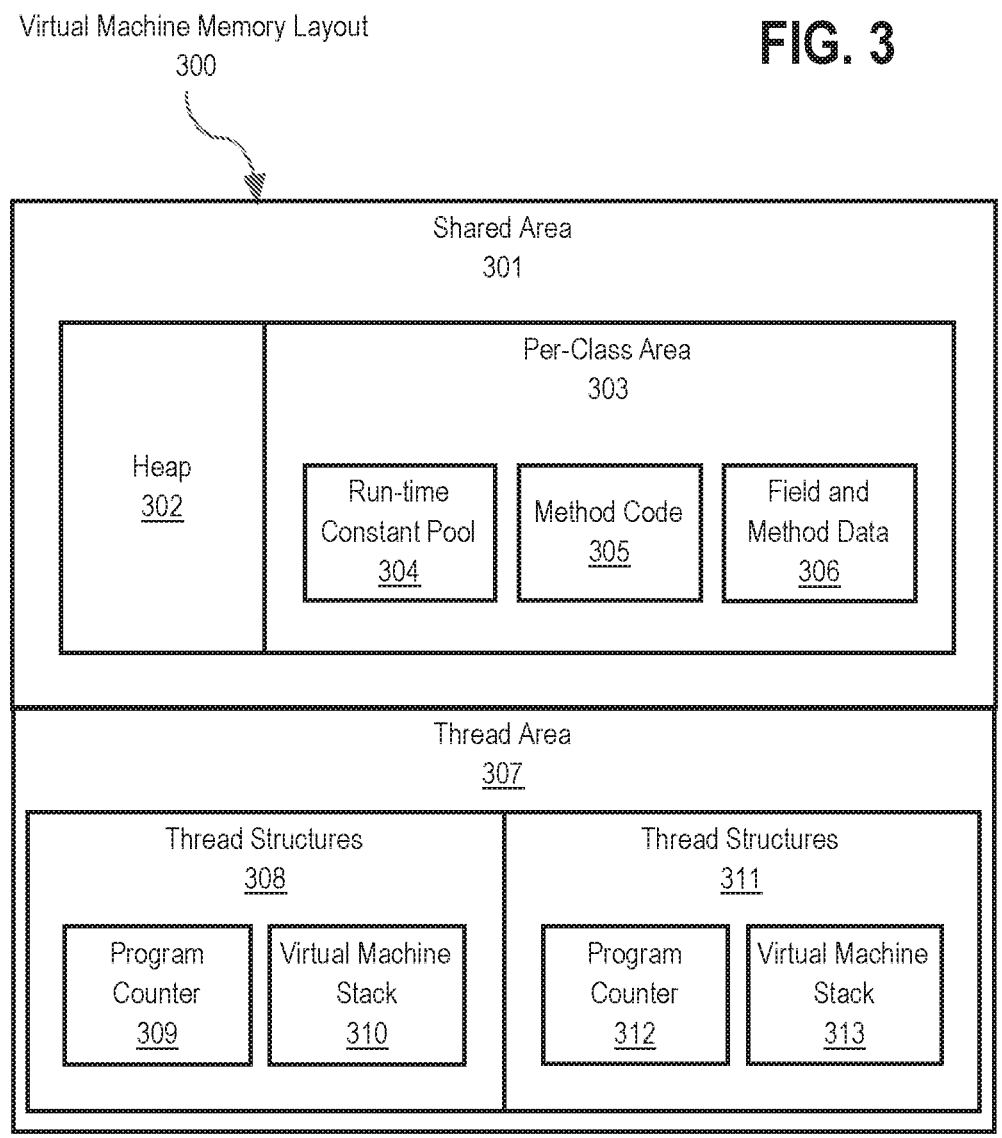
FIG. 3 illustrates an example virtual machine memory layout in block diagram form according to an embodiment.

FIG. 3 illustrates an example virtual machine memory layout 300 in block diagram form according to an embodiment. In order to provide clear examples, the remaining discussion will assume that the virtual machine 104 adheres to the virtual machine memory layout 300 depicted in FIG. 3. In addition, although components of the virtual machine memory layout 300 may be referred to as memory "areas", there is no requirement that the memory areas are contiguous.

In the example illustrated by FIG. 3, the virtual machine memory layout 300 is divided into a shared area 301 and a thread area 307. The shared area 301 represents an area in memory where structures shared among the various threads executing on the virtual machine 104 are stored. The shared area 301 includes a heap 302 and a per-class area 303. In an embodiment, the heap 302 represents the run-time data area from which memory for class instances and arrays is allocated. In an embodiment, the per-class area 303 represents the memory area where the data pertaining to the individual classes are stored. In an embodiment, the per-class area 303 includes, for each loaded class, a run-time constant pool 304 representing data from the constant table 201 of the class, field and method data 306 (for example, to hold the static fields of the class), and the method code 305 representing the virtual machine instructions for methods of the class.

The thread area 307 represents a memory area where structures specific to individual threads are stored. In FIG. 3, the thread area 307 includes thread structures 308 and thread structures 311, representing the per-thread structures utilized by different threads. In order to provide clear examples, the thread area 307 depicted in FIG. 3 assumes two threads are executing on the virtual machine 104. However, in a practical environment, the virtual machine 104 may execute any arbitrary number of threads, with the number of thread structures scaled accordingly.

In an embodiment, thread structures 308 includes program counter 309 and virtual machine stack 310. Similarly, thread structures 311 includes program counter 312 and virtual machine stack 313. In an embodiment, program counter 309 and program counter 312 store the current address of the virtual machine instruction being executed by their respective threads.

Thus, as a thread steps through the instructions, the program counters are updated to maintain an index to the current instruction. In an embodiment, virtual machine stack 310 and virtual machine stack 313 each store frames for their respective threads that hold local variables and partial results, and is also used for method invocation and return.

In an embodiment, a frame is a data structure used to store data and partial results, return values for methods, and perform dynamic linking. A new frame is created each time a method is invoked. A frame is destroyed when the method that caused the frame to be generated completes. Thus, when a thread performs a method invocation, the virtual machine 104 generates a new frame and pushes that frame onto the virtual machine stack associated with the thread.

When the method invocation completes, the virtual machine 104 passes back the result of the method invocation to the previous frame and pops the current frame off of the stack. In an embodiment, for a given thread, one frame is active at any point. This active frame is referred to as the current frame, the method that caused generation of the current frame is referred to as the current method, and the class to which the current method belongs is referred to as the current class.

Figure 4:
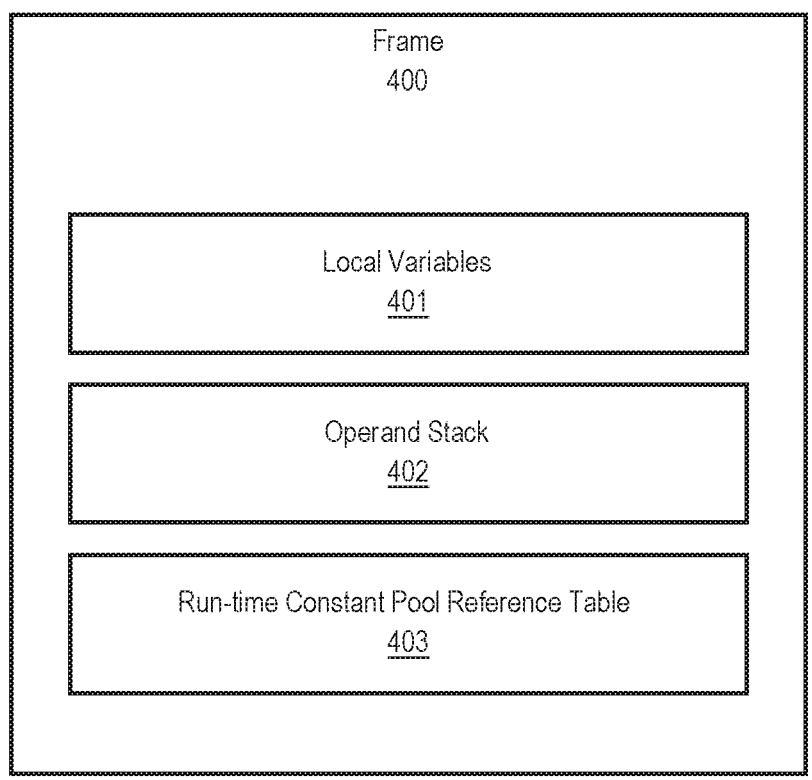
FIG. 4 illustrates an example frame in block diagram form according to an embodiment.

FIG. 4 illustrates an example frame 400 in block diagram form according to an embodiment. In order to provide clear examples, the remaining discussion will assume that frames of virtual machine stack 310 and virtual machine stack 313 adhere to the structure of frame 400.

In an embodiment, frame 400 includes local variables 401, operand stack 402, and run-time constant pool reference table 403. In an embodiment, the local variables 401 are represented as an array of variables that each hold a value, for example, Boolean, byte, char, short, int, float, or reference. Further, some value types, such as longs or doubles, may be represented by more than one entry in the array. The local variables 401 are used to pass parameters on method invocations and store partial results. For example, when generating the frame 400 in response to invoking a method, the parameters may be stored in predefined positions within the local variables 401, such as indexes 1-N corresponding to the first to Nth parameters in the invocation.

In an embodiment, the operand stack 402 is empty by default when the frame 400 is created by the virtual machine 104. The virtual machine 104 then supplies instructions from the method code 305 of the current method to load constants or values from the local variables 401 onto the operand stack 402. Other instructions take operands from the operand stack 402, operate on them, and push the result back onto the operand stack 402. Furthermore, the operand stack 402 is used to prepare parameters to be passed to methods and to receive method results. For example, the parameters of the method being invoked could be pushed onto the operand stack 402 prior to issuing the invocation to the method. The virtual machine 104 then generates a new frame for the method invocation where the operands on the operand stack 402 of the previous frame are popped and loaded into the local variables 401 of the new frame. When the invoked method terminates, the new frame is popped from the virtual machine stack and the return value is pushed onto the operand stack 402 of the previous frame.

In an embodiment, the run-time constant pool reference table 403 contains a reference to the run-time constant pool 304 of the current class. The run-time constant pool reference table 403 is used to support resolution. Resolution is the process whereby symbolic references in the constant pool 304 are translated into concrete memory addresses, loading classes as necessary to resolve as-yet-undefined symbols and translating variable accesses into appropriate offsets into storage structures associated with the run-time location of these variables.

2.3 Loading, Linking, and Initializing

In an embodiment, the virtual machine 104 dynamically loads, links, and initializes classes. Loading is the process of finding a class with a particular name and creating a representation from the associated class file 200 of that class within the memory of the runtime environment 113. For example, creating the run-time constant pool 304, method code 305, and field and method data 306 for the class within the per-class area 303 of the virtual machine memory layout 300. Linking is the process of taking the in-memory representation of the class and combining it with the run-time state of the virtual machine 104 so that the methods of the class can be executed. Initialization is the process of executing the class constructors to set the starting state of the field and method data 306 of the class and/or create class instances on the heap 302 for the initialized class.

The following are examples of loading, linking, and initializing techniques that may be implemented by the virtual machine 104. However, in many embodiments, the steps may be interleaved, such that an initial class is loaded, then during linking a second class is loaded to resolve a symbolic reference found in the first class, which in turn causes a third class to be loaded, and so forth. Thus, progress through the stages of loading, linking, and initializing can differ from class to class. Further, some embodiments may delay (perform "lazily") one or more functions of the loading, linking, and initializing process until the class is actually required. For example, resolution of a method reference may be delayed until a virtual machine instruction invoking the method is executed. Thus, the exact timing of when the steps are performed for each class can vary greatly between implementations.

To begin the loading process, the virtual machine 104 starts up by invoking the class loader 107 which loads an initial class. The technique by which the initial class is specified will vary from embodiment to embodiment. For example, one technique may have the virtual machine 104 accept a command line argument on startup that specifies the initial class.

To load a class, the class loader 107 parses the class file 200 corresponding to the class and determines whether the class file 200 is well-formed (meets the syntactic expectations of the virtual machine 104). If not, the class loader 107 generates an error. For example, in Java the error might be generated in the form of an exception which is thrown to an exception handler for processing. Otherwise, the class loader 107 generates the in-memory representation of the class by allocating the run-time constant pool 304, method code 305, and field and method data 306 for the class within the per-class area 303.

In some embodiments, when the class loader 107 loads a class, the class loader 107 also recursively loads the super-classes of the loaded class. For example, the virtual machine 104 may ensure that the super-classes of a particular class are loaded, linked, and/or initialized before proceeding with the loading, linking and initializing process for the particular class.

During linking, the virtual machine 104 verifies the class, prepares the class, and performs resolution of the symbolic references defined in the run-time constant pool 304 of the class.

To verify the class, the virtual machine 104 checks whether the in-memory representation of the class is structurally correct. For example, the virtual machine 104 may check that each class except the generic class Object has a superclass, check that final classes have no sub-classes and final methods are not overridden, check whether constant pool entries are consistent with one another, check whether the current class has correct access permissions for classes/fields/structures referenced in the constant pool 304, check that the virtual machine 104 code of methods will not cause unexpected behavior (e.g. making sure a jump instruction does not send the virtual machine 104 beyond the end of the method), and so forth. The exact checks performed during verification are dependent on the implementation of the virtual machine 104. In some cases, verification may cause additional classes to be loaded, but does not necessarily require those classes to also be linked before proceeding. For example, assume Class A contains a reference to a static field of Class B. During verification, the virtual machine 104 may check Class B to ensure that the referenced static field actually exists, which might cause loading of Class B, but not necessarily the linking or initializing of Class B. However, in some embodiments, certain verification checks can be delayed until a later phase, such as being checked during resolution of the symbolic references. For example, some embodiments may delay checking the access permissions for symbolic references until those references are being resolved.

To prepare a class, the virtual machine 104 initializes static fields located within the field and method data 306 for the class to default values. In some cases, setting the static fields to default values may not be the same as running a constructor for the class. For example, the verification process may zero out or set the static fields to values that the constructor would expect those fields to have during initialization.

During resolution, the virtual machine 104 dynamically determines concrete memory address from the symbolic references included in the run-time constant pool 304 of the class. To resolve the symbolic references, the virtual machine 104 utilizes the class loader 107 to load the class identified in the symbolic reference (if not already loaded). Once loaded, the virtual machine 104 has knowledge of the memory location within the per-class area 303 of the referenced class and its fields/methods. The virtual machine 104 then replaces the symbolic references with a reference to the concrete memory location of the referenced class, field, or method. In an embodiment, the virtual machine 104 caches resolutions to be reused in case the same class/name/descriptor is encountered when the virtual machine 104 processes another class. For example, in some cases, class A and class B may invoke the same method of class C. Thus, when resolution is performed for class A, that result can be cached and reused during resolution of the same symbolic reference in class B to reduce overhead.

In some embodiments, the step of resolving the symbolic references during linking is optional. For example, an embodiment may perform the symbolic resolution in a "lazy" fashion, delaying the step of resolution until a virtual machine instruction that requires the referenced class/method/field is executed.

During initialization, the virtual machine 104 executes the constructor of the class to set the starting state of that class. For example, initialization may initialize the field and method data 306 for the class and generate/initialize any class instances on the heap 302 created by the constructor. For example, the class file 200 for a class may specify that a particular method is a constructor that is used for setting up the starting state. Thus, during initialization, the virtual machine 104 executes the instructions of that constructor.

In some embodiments, the virtual machine 104 performs resolution on field and method references by initially checking whether the field/method is defined in the referenced class. Otherwise, the virtual machine 104 recursively searches through the super-classes of the referenced class for the referenced field/method until the field/method is located, or the top-level superclass is reached, in which case an error is generated.

2.4. Virtual Machine Analysis Engine and Network Manager

Figure 5:
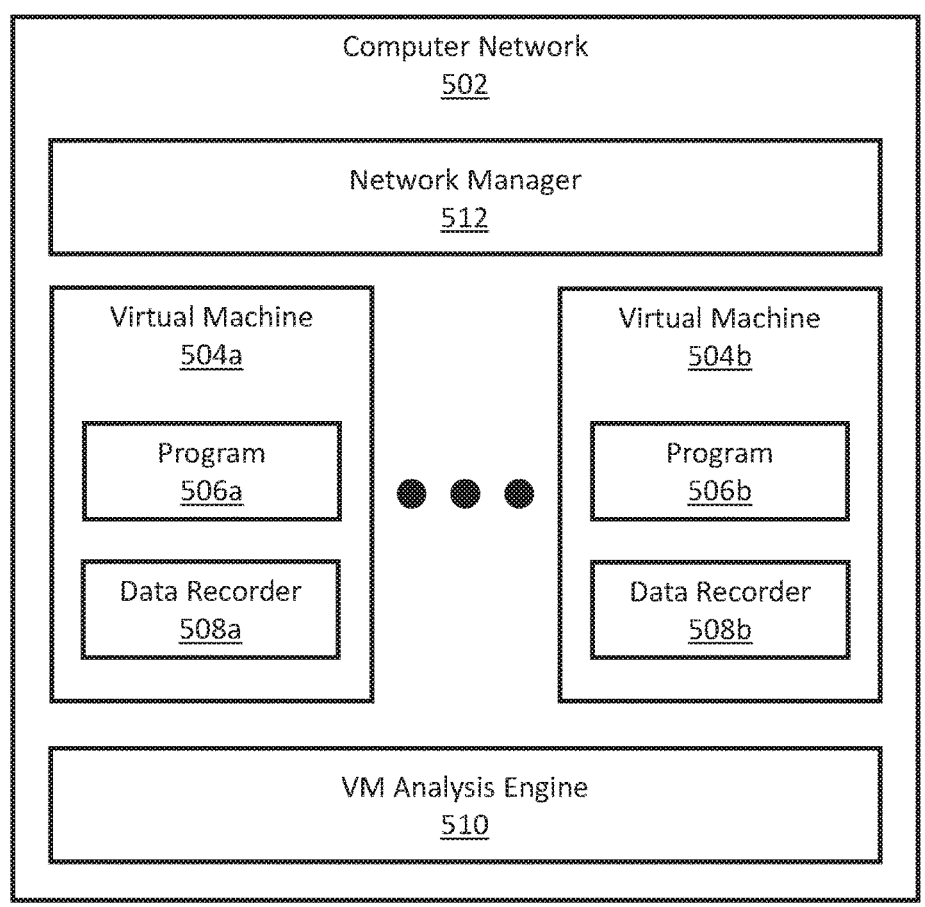
FIG. 5 illustrates a system in accordance with one or more embodiments.

FIG. 5 illustrates a system in accordance with one or more embodiments. As illustrated, system 500 includes a computer network 502, a virtual machine (VM) analysis engine 510, and a network manager 512. The computer network 502 includes one or more VMs (such as VM 504a and VM 504b). In one or more embodiments, system 500 may include more or fewer components than the components illustrated in FIG. 5. The components illustrated in FIG. 5 may be local to or remote from each other. The components illustrated in FIG. 5 may be implemented in software and/or hardware. Each component may be distributed over multiple applications and/or machines. Multiple components may be combined into one application and/or machine. Operations described with respect to one component may instead be performed by another component.

In one or more embodiments, a computer network 502 provides a pool of resources that are shared amongst multiple client devices. Examples of resources include a VM (such as VM 504a or VM 504b), a processor, a server, a data storage device (e.g., memory, a hard disk, a tape drive, etc.), a platform, and/or a software application. Client devices may independently request computing services, such as server time and network storage space, as needed. The resources may be dynamically assigned to the requests and/or client devices on an on-demand basis.

In an embodiment, a computer network 502 is shared amongst multiple tenants (also referred to as "customers"). Each tenant is associated with one or more client devices for accessing resources of the computer network 502.

A virtual machine (such as VM 504a or VM 504b) is an emulation of a particular computer system. A VM included in the computer network 502 may be the VM 104 described above with reference to FIGS. 1-4. A VM included in the computer network 502 may be, for example, a Java Virtual Machine (JVM).

Multiple VMs of a computer network 502 may execute a same program and/or application. As illustrated, for example, program 506a and program 506b are a same program. VM 504a executes program 506a. VM 504b executes program 506b. Client devices and/or other devices may request computing services of the program from the computer network 502. A subset of requests may be directed to VM 504a. Another subset of requests may be directed to VM 504b. Additional descriptions regarding computer networks 502 are included below.

In one or more embodiments, a data recorder (such as data recorder 508a or data recorder 508b) is a tool for collecting runtime information about a VM and/or one or more programs executing on the VM. A data recorder may be associated and/or integrated with a particular VM. As illustrated, for example, data recorder 508a is associated with VM 504a. Data recorder 508b is associated with VM 504b.

A data recorder collects information about "events." Each event is associated with an identifier, a time stamp, and an optional payload. The payload includes information related to the event, such as the CPU usage and the heap size before and/or after the event. Various types of events may occur, such as a duration event, an instant event, and a sample event. A duration event takes some time to occur, and is logged when it completes. A user may set a threshold for duration events, so that only events lasting longer than the specified period of time are recorded. An instant event occurs instantly, and is logged right away. A sample event (also called requestable event) is logged at a regular interval to provide a sample of system activity. A user may configure how often sampling occurs.

In an embodiment, a data recorder is configured to determine one or more performance characteristics of its associated VM(s). The data recorder may be considered a sub-component of a VM analysis engine 510. A performance characteristic may include runtime information about a VM or a program executing on the VM that is determined during the execution of a program. A performance characteristic may be a numerical value, a Boolean value, a statistic, and/or a trend. Examples of performance characteristics include an amount of memory used in executing the program, a number of occurrences of a particular error and/or warning, an overflow of a heap (such as heap 302 of FIG. 3), an overflow of a method area (such as per-class area 303 of FIG. 3), an overflow of a stack (such as virtual machine stack 310 of FIG. 3), an overflow of a code cache (such as a cache used by JIT compiler 109 of FIG. 1), statistics regarding the promotion of objects from one generation to another generation in the heap, the latency in the execution of the program during garbage collection, and the throughput of the virtual machine while executing the program. In an embodiment, a data recorder is configured to determine one or more performance characteristics used to generate memory health metrics as described below.

In an embodiment, a VM analysis engine 510 is configured to generate memory health metrics. The VM analysis engine 510 may generate memory health metrics based on performance characteristics obtained from one or more data recorders. A memory health metric may be computed as described below.

In one or more embodiments, a network manager 512 refers to hardware and/or software configured to manage one or more resources of the computer network 502. The network manager 512 may, for example, initiate VMs for executing a particular program, specify values for VM startup parameters, terminate VMs, and direct and/or redirect traffic to a particular VM.

3. Memory Health Metrics

3.1 Generating a Memory Health Metric

FIGS. 6A-6D illustrate an example set of operations for generating a memory health metric in accordance with one or more embodiments. One or more operations illustrated in FIGS. 6A-6D may be modified, rearranged, or omitted all together. Accordingly, the particular sequence of operations illustrated in FIGS. 6A-6D should not be construed as limiting the scope of one or more embodiments.

In an embodiment, a system begins monitoring data stored in memory (Operation 602). The system may include a data recorder, as described above, that monitors one or more virtual machines and determines performance characteristics relating to memory in the virtual machine(s). The system may monitor any kind of memory, including but not limited to: heap memory; stack memory; code cache; metadata storage; native memory; short-term storage media; long-term storage media; or any other kind of memory or combination thereof. The memory may be transient (e.g., random access memory) or persistent (e.g., a hard disk). In an embodiment, the stored data is located in a data structure. Examples of data structures include trees (e.g., a binary tree), heaps, lists (e.g., a "last in first out" (LIFO) list), pools (e.g. one or more pools storing young and/or old objects), arrays, or any other kind of data structure or combination thereof. Many different kinds of data structures may store many different kinds of data. The system monitors the data stored in memory at runtime, in order to generate a memory health metric associated with runtime conditions.

In an embodiment, the system filters out a data set from the stored data (Operation 603). Specifically, the system filters out a data set to be used in determining a memory health metric. As noted above, stored data may be located in a data structure. Accordingly, in an embodiment, the filtered out data set represents a subset of the data in the data structure. The system may filter out a data set in many different ways. If the stored data includes data for multiple tenants, the system may filter out a data set used by one or more particular tenants. Alternatively or in addition, if the stored data includes objects of different types, the system may filter out objects of one or more particular types. Alternatively or in addition, the system may filter out only a certain type of stored data, such as heap data. Alternative or in addition, the system may filter out a particular field type, such as boolean fields, arrays, etc. The system may combine two or more kinds of filters to obtain a more granular data set. For example, the system may filter out a particular kind of field for a particular object type. A more granular data set may allow for a more granular memory health metric. Isolating ineffective memory use to a particular kind of memory, object type, field type, etc. may facilitate refactoring for improved efficiency.

In an embodiment, a memory health metric is computed as a function of data entropy, as described in further detail below. Memory utilization may be considered "healthy" or "unhealthy" when the memory health metric crosses (i.e., falls above or below) a particular threshold value. The threshold value is a measure beyond which (i.e., above or below) memory use is considered unacceptably inefficient. In general, memory use is considered inefficient when the memory health metric deviates significantly from what would be expected for random data in an efficient data storage mechanism. In an embodiment, the system determines a threshold value of the memory health metric (Operation 604). The threshold value indicates how much entropy (i.e., payload data) is minimally expected in the data set, relative to (e.g., as a percentage of) the maximum possible entropy. At the extreme, the data set may include only payload data (100% entropy) or only overhead (0% entropy). In practice, an acceptable amount of entropy may fall somewhere in between. For example, the threshold value may indicate that a minimum entropy of 20% is expected.

In an embodiment, depending on the type of memory health metric used, the threshold value may be a percentage, a real number, or any other kind of value suitable for evaluating a memory health metric. The threshold value may be based on a user-supplied setting, i.e., a software configuration. Alternatively or in addition, a threshold value may be based on historical data, such as an average measure of memory health metrics over a period of time and/or statistics obtained from multiple tenants in a cloud system. The threshold value may be based on attributes of the data set, such as the kind of memory, size of the data set, type(s) included in the data set, etc. For example, the system may use one threshold value for a data set having objects of one type, and a different threshold value for another data set having objects of a different type. In an embodiment, the threshold value is based, at least in part, on how much of the stored data is consumed by the data set for which the memory health metric is calculated. Unhealthy memory utilization may not be a significant concern if the data set consumes only a small portion of the stored data, while moderately healthy memory utilization may be a significant concern if the data set consumes a large portion of the stored data.

In an embodiment, the system computes a memory health metric for the data set (Operation 605). The memory health metric may take many different forms. In general, the memory health metric indicates a relationship between the total size of the data set and an estimate of how much payload the data set includes. For example, the memory health metric may include a ratio of compressed size to uncompressed size, as described below. In an embodiment, the memory health metric is a function of the data set's estimated entropy. Entropy is a measure (or approximation thereof) of how much payload the data set includes, excluding overhead. For a given data set, high entropy indicates more payload than low entropy. The maximum possible entropy is the total size of the data set, if the data set consists entirely of payload data. As noted above, the memory health metric may be more or less granular depending on the granularity of the data set used. Operations for computing a memory health metric are discussed in further detail below.

In an embodiment, the system adjusts the memory health metric based, at least in part, on the amount of space that the data set occupies in the stored data. For example, the system may weight (using multiplication, division, etc.) the memory health metric based on a ratio of the size of the data set to the overall size of the stored data. Weighting the memory health metric in this manner may help ensure that the memory health metric captures the overall significance of the particular data set's health, relative to the amount of space in the stored data that the data set consumes.

In an embodiment, the system determines whether the memory health metric satisfies the threshold value (Operation 606), i.e., falls above or below the threshold value in a range that is considered "healthy." If the memory health metric satisfies the threshold value, the system continues monitoring data stored in memory (Operation 602). The system may continue monitoring the same data set or may filter out a different data set (Operation 603).

In an embodiment, if the memory health metric does not satisfy the threshold value (i.e., the memory health metric crosses the threshold value), the system presents a warning based on the memory health metric (Operation 608). The warning indicates that memory utilization is "unhealthy," i.e., the data set is not using the memory efficiently, as determined based on the memory health metric. In an embodiment, the warning indicates one or more particular data sets, for which one or more memory health metrics were computed, to which the inefficiency is attributable. As noted above, a data set may be more or less granular depending, for example, on the filter(s) applied to obtain the data set. Accordingly, the warning may indicate, with more or less granularity, one or more specific portions of the stored data to which the inefficiency is attributable. Alternatively or in addition, the warning may include other kinds of information. For example, the warning may include the memory health metric itself, details about an object type and/or field type for which the system computed the memory health metric, a suggestion for improving memory health (e.g., by refactoring source code to use the memory more efficiently, as described below), or any other information or combination thereof associated with the determination that the memory utilization is "unhealthy."

In an embodiment, the system computes memory health metrics for multiple data sets (e.g., different data sets corresponding to objects of different types in the stored data). The warning may indicate, based on multiple memory health metrics, one or more data sets that contribute most to the overall health of the stored data, i.e., to which poor health is most attributable. For example, consider stored data that includes objects of type A and objects of type B, where the data in objects of type A is less healthy. The system may compute memory metrics for both types of objects. A warning may indicate that objects of type A contribute most to poor health of the stored data, i.e., that the overall poor health is most attributable to objects of type A. As noted above, the system may adjust a memory health metric based on how much space a particular data set occupies in the stored data. In the preceding example, objects of type A (a particular data set) may occupy more space than objects of type B (another data set). Even if the data in objects of type B is less healthy than the data in objects of type A, the system may nonetheless determine that objects of type A contribute more, overall, to poor health of the stored data.

In an embodiment, a warning indicates that poor health of stored data is fully attributable to a particular data set. For example, stored data may include three data sets A, B, and C. Memory health metrics for data sets A and B are in a healthy range, i.e., do not cross the threshold value. A memory health metric for data set C crosses the threshold value. In this example, a warning may indicate that poor health of the stored data is fully attributable to data set C. Alternatively or in addition, the warning may indicate that poor health of stored data is partly attributable to a particular data set. For example, a memory health metric for data set A may be in a healthy range, while memory health metrics for both data sets B and C exceed the threshold value. In this example, a warning may indicate that poor health of the stored data is partly attributable to data set B and partly attributable to data set C. As discussed above, in a situation where multiple data sets contribute to the stored data's poor health, a warning may indicate that the poor health is more attributable to one data set than to the other. In the preceding example, a warning may indicate that the poor health is more attributable to data set B than data set C, or vice versa. Alternatively or in addition, a warning may indicate that poor health of stored data is not attributable to a particular data set. In the preceding example, because the memory health metric for data set A is in a healthy range, a warning may indicate that poor health of the stored data is not attributable to data set A.

In an embodiment, the system presents the warning by writing to a log file or command line, generating an electronic message such as an email or text message, generating a popup in a graphical user interface, or in any other kind of human-readable format. For example, the system may generate a graphical user interface that includes a storage map representing the stored data. The storage map may indicate the health of one or more portions of the stored data. The storage map may indicate memory health metrics using color coding (e.g., representing "hot spots" of poor memory health with particular colors), numerical labels, text labels, degrees of shading, or any other visual indicator or combination thereof. Alternatively or in addition, the storage map may include visual distinctions (e.g., color coding, numerical labels, text labels, degrees of shading, etc.) indicating one or more areas of the stored data that correspond to payload data and one or more areas of the stored data that correspond to overhead. Alternatively or in addition, the storage map may indicate how much of the stored data is occupied by different data sets. In an embodiment, a storage map is a visual tool that allows for efficient and accurate diagnosis of unhealthy memory utilization. The warning may prompt a system operator and/or software developer to restart the system, allocate more resources, request a code upgrade, and/or take some other action to mitigate the inefficient memory use.

In an embodiment, to improve memory efficiency based on the warning, one or more software developers may refactor the source code associated with the problematic types. The developers may combine multiple types into a single type, delete unused fields, move infrequently used types to a side table, "joint-encode" two attributes into one field, combine often-repeated data into a federated object that may be referenced from multiple locations, or perform any other kind of refactoring or combination thereof to mitigate the inefficiency. Refactored source code may be compiled, applied to the runtime system, and evaluated again using techniques described herein. Some kinds of refactoring may be performed automatically by a process running in the computer system. Alternatively or in addition, a garbage collector may be modified to age unutilized objects faster, leaving more space for utilized fields in young memory regions.

In an embodiment, generating a memory health metric, as described herein, improves functioning of the computer system by identifying inefficient memory use and providing opportunities to mitigate the inefficiency. When memory use is more efficient, the computer system may run faster due to lower memory utilization. If the inefficiency is due to a large number of unutilized fields, the computer system may slow due to increased cache overflows, linear searching, garbage collection cycles, etc. A cost of operating the computer system may decrease due to lower resource needs, including components (memory, storage, bandwidth, etc.), electricity consumption, and/or other operational costs. For tenants of a cloud system, utilization costs may decrease when the cloud system does not need to provision as much memory for the tenant. In addition, inefficient memory use may be a sign of an impending system failure. If a process is generating a large number of unutilized fields, those fields may eventually consume all the available memory, causing a system failure. The system may need to be restarted, resulting in potentially expensive downtime and/or data loss. Particularly (but not exclusively) for large-scale computer systems (e.g., cloud systems, data centers, etc.), even a small improvement in memory efficiency may result in significant operational improvements and/or cost savings.

3.2 Memory Health Metrics Based on Compressibility

Figure 6A:
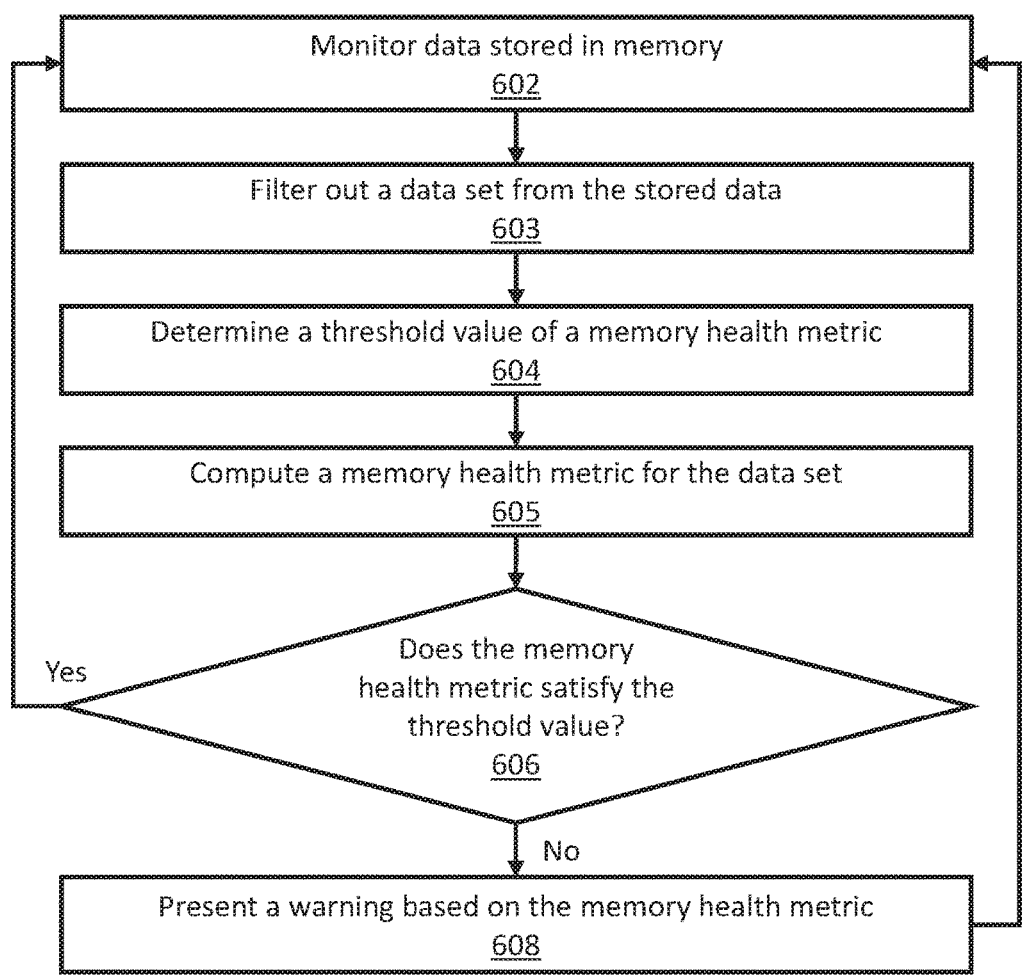
FIGS. 6A-6D illustrate a set of operations for generating memory health metrics in accordance with one or more embodiments.
Figure 6B:
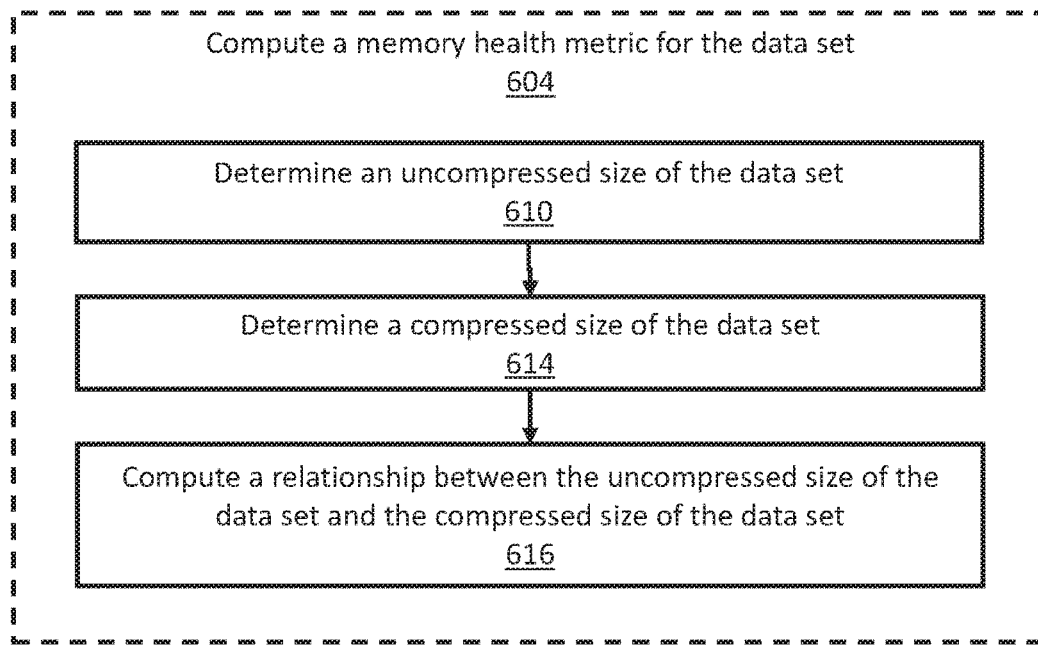

FIG. 6B illustrates an example set of operations for computing a memory health metric based on compressibility of a data set. Compression algorithms operate by identifying redundancies, i.e., repetitions, and removing the redundancies so that the data occupies less memory.

In an embodiment, the system determines an uncompressed size of the data set (Operation 610). The system also determines a compressed size of the data set (Operation 614). The compressed size of the data set supplies an estimate of the data set's entropy, which may be compared against the uncompressed size of the same data set. To determine a compressed size of the data set, the system may run the data set through a compression algorithm. Alternatively or in addition, the system may estimate the compressed size of the data set without actually running the data set through a compression algorithm. Because different compression algorithms are more or less effective with different types of data, the system may use multiple compression algorithms, independent of each other. The system may choose the smallest compressed size of the multiple attempts.

In an embodiment, the system computes a relationship between the uncompressed size of the data set and the compressed size of the data set (Operation 616). The system may compute the relationship as a ratio of the two values. If the system computes the ratio as compressed size divided by uncompressed size, then the ratio will have a value less than or equal to one, with smaller values indicating worse health in the data set (i.e., the compression was able to remove more redundancies, indicating that the data set includes less payload data). If the system computes the ratio as uncompressed size divided by compressed size, then the ratio will have a value greater than or equal to one, with higher values indicating poorer health in the data set.

In an embodiment, when computing a memory health metric based on compressibility of a data set, the system may apply different operations for one subset of the data set than for another subset of the data set. The system may apply different operations to account for certain kinds of overhead that are less repetitive (and therefore less compressible) than other kinds of overhead. If a compression algorithm were applied to these kinds of overhead as-is, the resulting memory health metric may incorrectly inflate the memory's health, by failing to discount adequately for the less compressible overhead. As one example, in the Java programming language, object headers include overhead that may resemble payload data to a compression algorithm or entropy computation. Such overhead includes, but is not limited to, the object's type field (reported by the getClass( ) method), the object's unique identification hash code, a pointer to a Thread object if the object is synchronized, etc. Information in an object header may vary over time. As another example, garbage collectors and heap managers generate tracking information when moving objects about in memory. Tracking information includes data (e.g., the objects' memory addresses) that may resemble payload data to a compression algorithm or entropy computation. As another example, overhead may be encrypted so that it resembles payload and cannot be unencrypted without the corresponding encryption key(s). To account for overhead that is less compressible than other kinds of overhead, the system may exclude less compressible overhead from computations of memory health metrics. Alternatively or in addition, the system may apply a different compression technique that is known to produce better compression for certain kinds of overhead. Excluding less compressible overhead from the computations, or applying a different compression technique to achieve better compression for such overhead, may help avoid a memory health metric that makes an unhealthy data set appear healthy.

Alternatively or in addition, the system may apply different operations to certain kinds of data, or portions thereof, that appear to store only overhead or unutilized fields. As one example, some numerical types include a sign bit, indicating whether the number is positive or negative. While the sign bit is useful to runtime software, it may be treated as overhead and discounted when computing the compressed size of the data set. As another example, the system may heavily discount default field values (e.g., zero or null) when computing the compressed size of the data set. The system may discount such values to one bit or less. Discounting default values may improve the accuracy of the memory health metric when the memory includes a significant number of unutilized fields, such as pre-allocated arrays that occupy memory but are not used at runtime.

3.3 Memory Health Metrics Based on Value Quantities

Figure 6C:
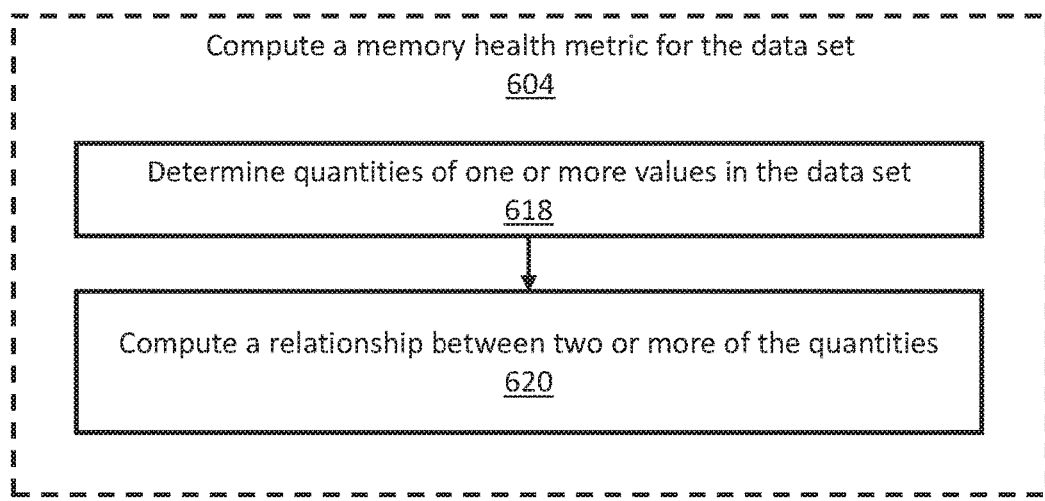
Figure 6D:
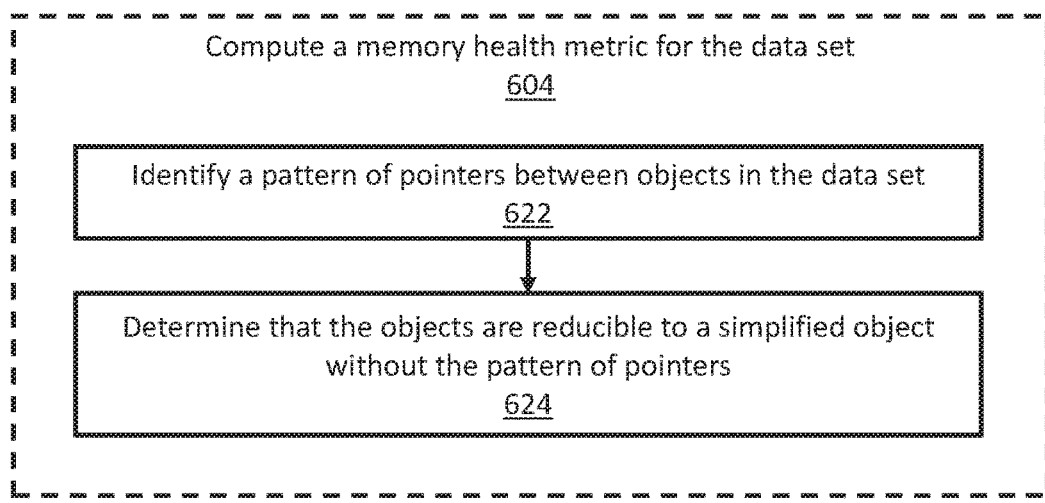

FIG. 6C illustrates an example set of operations for computing a memory health metric based on quantities of particular values in a data set. In general, given multiple instances of the same variable (e.g., multiple instances of a boolean field over multiple objects of the same type), a particular distribution of values is expected. In the example of a boolean field, a particular distribution of true and false values is expected. If the actual distribution at runtime is not in line with expectations, that may be a sign of an unutilized field. Continuing with the example of a boolean field, some of the field instances may have been declared with a default value (e.g., false, true, or null). An unexpected value distribution may indicate that a disproportionate number of instances of the field were declared but never changed from the default value.

In an embodiment, the system determines quantities of one or more values in the data set (Operation 618). The quantities may be measured as raw counts, such as the numbers of true, false, and null boolean values in the data set. Alternatively, the quantities may be measured as frequencies or percentages, such as the percentage of boolean values having true, false, and null values. For fields with a wide range of values (e.g., numerical fields), the system may treat ranges of values as "buckets" and determine the quantities of values in each bucket. The system may aggregate the quantities of the different values, or buckets of values, in a histogram data structure.

In an embodiment, the system computes a relationship between two or more of the quantities (Operation 620). The relationship may correspond to an entropy value based on the quantities. For example, consider a boolean field with a number #T of true values and a number #F of false values. The system may compute state probabilities, using one or more formulas such as the following:

$$p0 = \#F/(\#T + \#F)$$

$$p1 = \#T/(\#T + \#F)$$

The system may then compute the average entropy using one or more formulas such as the following:

$$avg = -(p0 \lg p0 + p1 \lg p1)$$

In this example, avg expresses entropy as a number of bits. When #T equals #F, avg is one bit. Otherwise, avg is less than one bit. Lower values of avg indicate worse health in the data set, i.e., a disproportionate value of either #T or #F. Lower values imply less payload. For example, an entropy value of 0.75 may be interpreted as meaning that the data set has 75 percent payload.

As an example of an estimation of entropy, consider a byte of memory with 256 possible values. If such a byte were regarded as a uniform random variable, its entropy (using a base 2 logarithm, although a natural logarithm or other base may be used) would be lg 256, or 8 bits. In this example, any data set of N bytes can show evidence of at most 8N bits of entropy. Thus, a data set showing evidence of 8N bits of entropy would have perfect memory utilization, i.e., maximum health. In contrast, a data set with detectable repetitive patterns would have a lower entropy estimate. For example, if 25% of the bytes were zero, and the rest of the bytes did not deviate detectably from expected statistics corresponding to perfect memory utilization, then the overall entropy value would indicate 75% efficient memory utilization. (The entropy measure of the zero bytes would be zero, while the entropy measure for the remaining bytes would be 6N, which is 75% of 8N.) As another example, if the N bytes were to show a uniform distribution between only four values, then each byte, viewed as a sample of a random variable, would have an entropy of lg 4. The overall entropy value would indicate a payload entropy of 2N bits, i.e., 25% efficient memory utilization. (Specifically, the statistical entropy per byte would be computed based on the observed probabilities as $-4(\frac{1}{4} \lg(\frac{1}{4}))$, denoting the negated sum of four terms of the form p(lg p), corresponding to the probability of each possible byte value.)

The preceding examples are provided for illustrative purposes only. In an embodiment, entropy estimations may be performed on units of bytes, machine words, and/or other kinds and sizes of sampled memory data. Alternatively or in addition, a system may not compute individual probabilities of memory unit values, but may apply an appropriate approximation technique, including but not limited to trial compression and/or other techniques described herein.

3.4 Memory Health Metrics Based on Structural Relationships

FIG. 6C illustrates an example set of operations for computing a memory health metric based on structural relationships in the data set. In this example, the structural relationships correspond to patterns of pointers between objects in the data set. In an embodiment, the system identifies a pattern of pointers between objects in the data set (Operation 622). For example, the system may determine that every (or nearly every) object of type A includes a pointer to an object of type B. The system may further determine that every (or nearly every) object of type B includes a pointer to an object of type C. Many different types of patterns may be identified. Such patterns may indicate low entropy, i.e., excessive overhead relative to the payload encapsulated in the objects.

In an embodiment, the system determines that the objects are reducible to a simplified object without the pattern of pointers (Operation 624). Because the pattern is so common, there is an opportunity to refactor the source code and eliminate the overhead associated with having multiple objects. In the example, above, each set of objects of types A, B, and C may be considered a "federated" object formed of multiple objects. An object of type D may be designed to have all the features (fields, methods, etc.) of types A, B, and C, without the overhead of multiple objects and pointers between them. Alternatively or in addition, if the fields of objects of each type also tend to have the same values, it may be possible to redesign a federated object as a value type. In general, it may be possible to refactor the source code to reduce the overhead used to encapsulate the payload data. When the system presents a warning as described above, the warning may include a recommendation for refactoring the source code.

As an example, consider the following pseudocode:
A=new Point (x0, y0);
B=new Point (x1, y1);
C=new Rectangle (A, B);
The example above requires two Point objects to instantiate the Rectangle object. If the Point type were a value type, the pseudocode could be written more efficiently as follows:
A=Point.make(x0, y0);
B=Point.make(x1, y1);
C=new Rectangle(A, B);
Alternatively, the Rectangle type could be refactored to avoid accessing the Point type at all, as follows:
C=new Rectangle(x0, y0, x1, y1);
Depending on the programming language and/or compiler used, either of the refactored versions above may consume less overhead in memory than the version that requires three separate objects.

In an embodiment, the system may combine different techniques for computing a memory health metric. The system may compute memory health metrics using two or more different techniques and select the metric that indicates either better or worse health. Selecting the metric that indicates worse health is a more aggressive approach, because it will generate a warning sooner than using a metric that indicates better health. Alternatively or in addition, the system may apply different techniques to different data sets (or subsets thereof). In practice, some techniques may be more accurate for certain kinds of data than for others, and the system may select a more effective technique for different subsets of data in the data set. Alternatively or in addition, the system may apply different techniques to the same data set, independently. If the system generates a memory health warning, the warning may include information about each technique applied.

4. Illustrative Examples

Detailed examples are described below for purposes of clarity. Components and/or operations described below should be understood as specific examples which may not be applicable to certain embodiments. Accordingly, components and/or operations described below should not be construed as limiting the scope of any of the claims.

Figure 7:
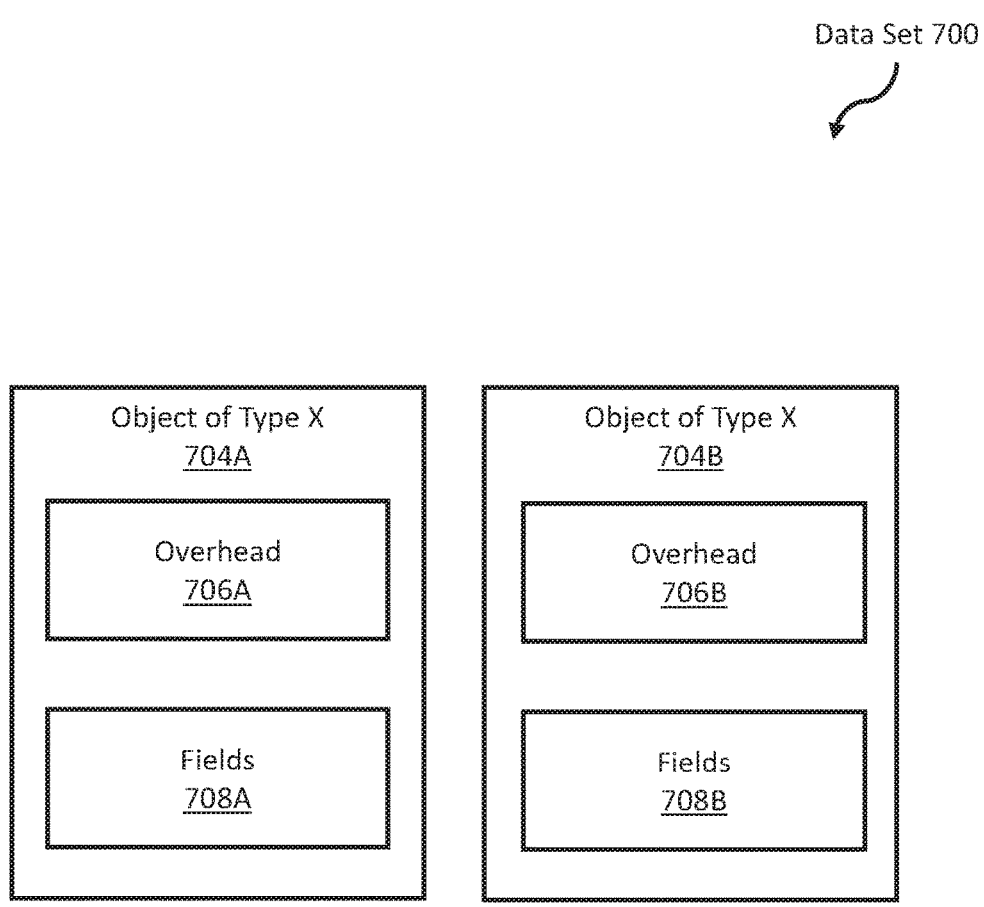
FIGS. 7-9 illustrate examples in accordance with one or more embodiments.

FIG. 7 illustrates a block diagram of an example data set 700 in accordance with one or more embodiments. As shown in FIG. 7, there are two objects of type X (704A and 704B). Each object has associated overhead (706A and 706B). In addition, because the objects are of the same type X, each object includes the same fields (708A and 708B). Efficiencies in overhead for one object of a particular type are likely to recur in the other object of the same type. The more objects there are of that type, the more overhead there will be.

Figure 8:
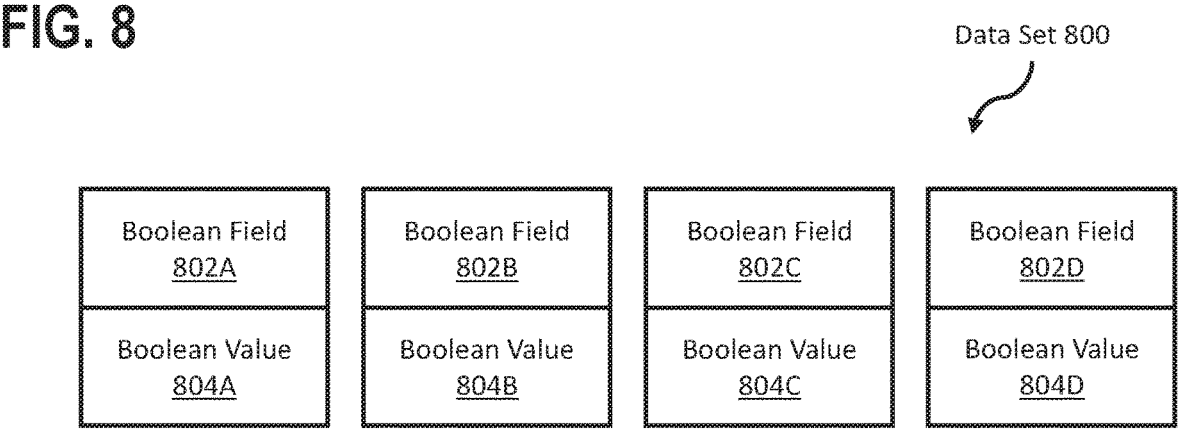

FIG. 8 illustrates a block diagram of an example data set 800 in accordance with one or more embodiments. This data set includes multiple boolean fields (802A through 802D) with corresponding boolean values (804A through 804D). As the size of the data set grows, it is increasingly statistically unlikely that all of the boolean values will be identical. A disproportionate quantity of identical values may indicate that some portion of the boolean fields are unutilized. The system may compute a memory health metric to determine the likelihood that some or all of the boolean fields are unutilized.

Figure 9:
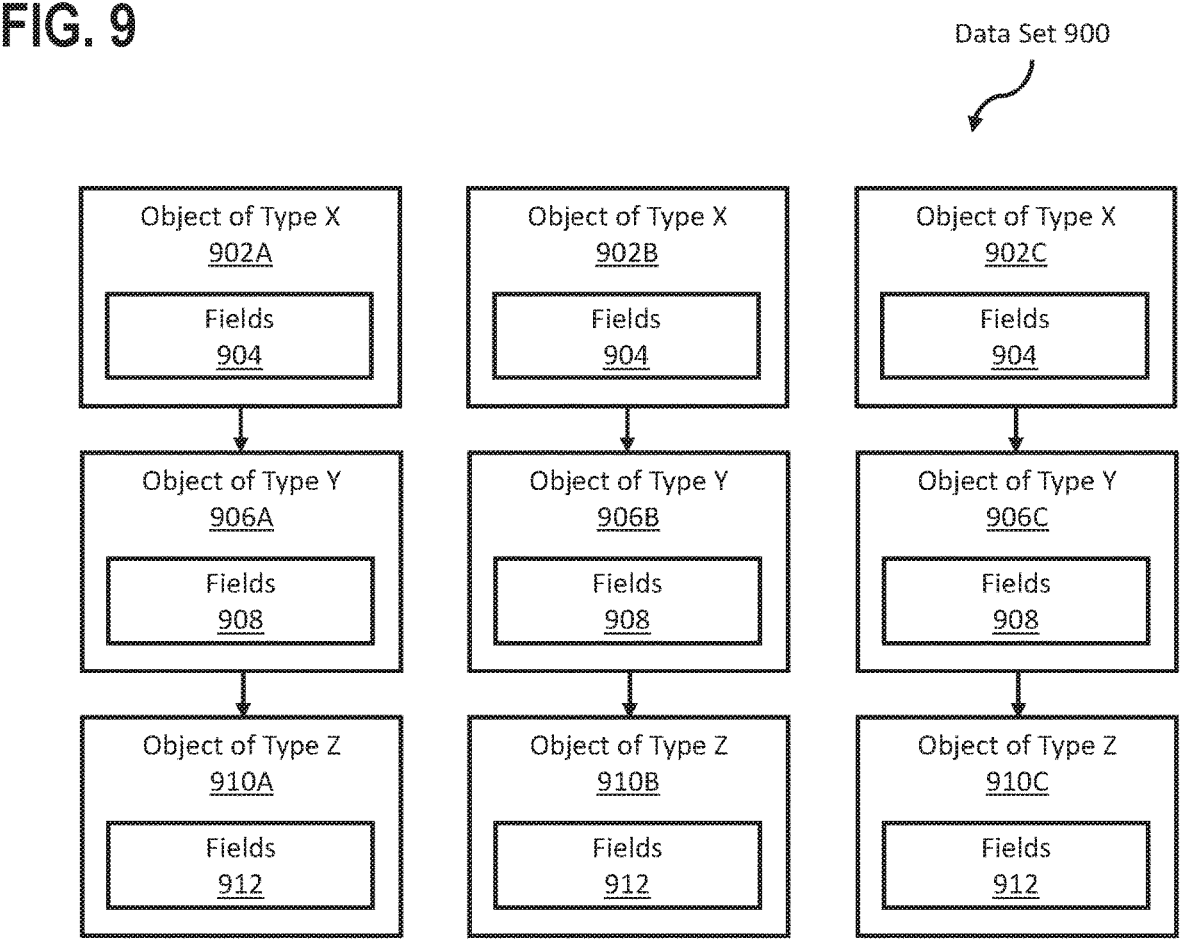

FIG. 9 illustrates a block diagram of an example data set 900 in accordance with one or more embodiments. The data set 900 includes three objects of type X (902A through 902C, three objects of type Y (906A through 906C), and three objects of type Z (910 A through 910 C). Each object of a type X has the same fields 904. Each object of type Y has the same fields 908. Each object of type Z has the same fields 912. The values of the fields may be different across instances of the same type. The pattern of pointers X to Y to Z forms a federated object. This federated object may be redesigned as a single type having the fields 904, 908, 912 from all three original types. If the fields tend to have the same values across objects of the same type, it may be possible to further reduce the federated object to a value type.

5. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

6. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 10:
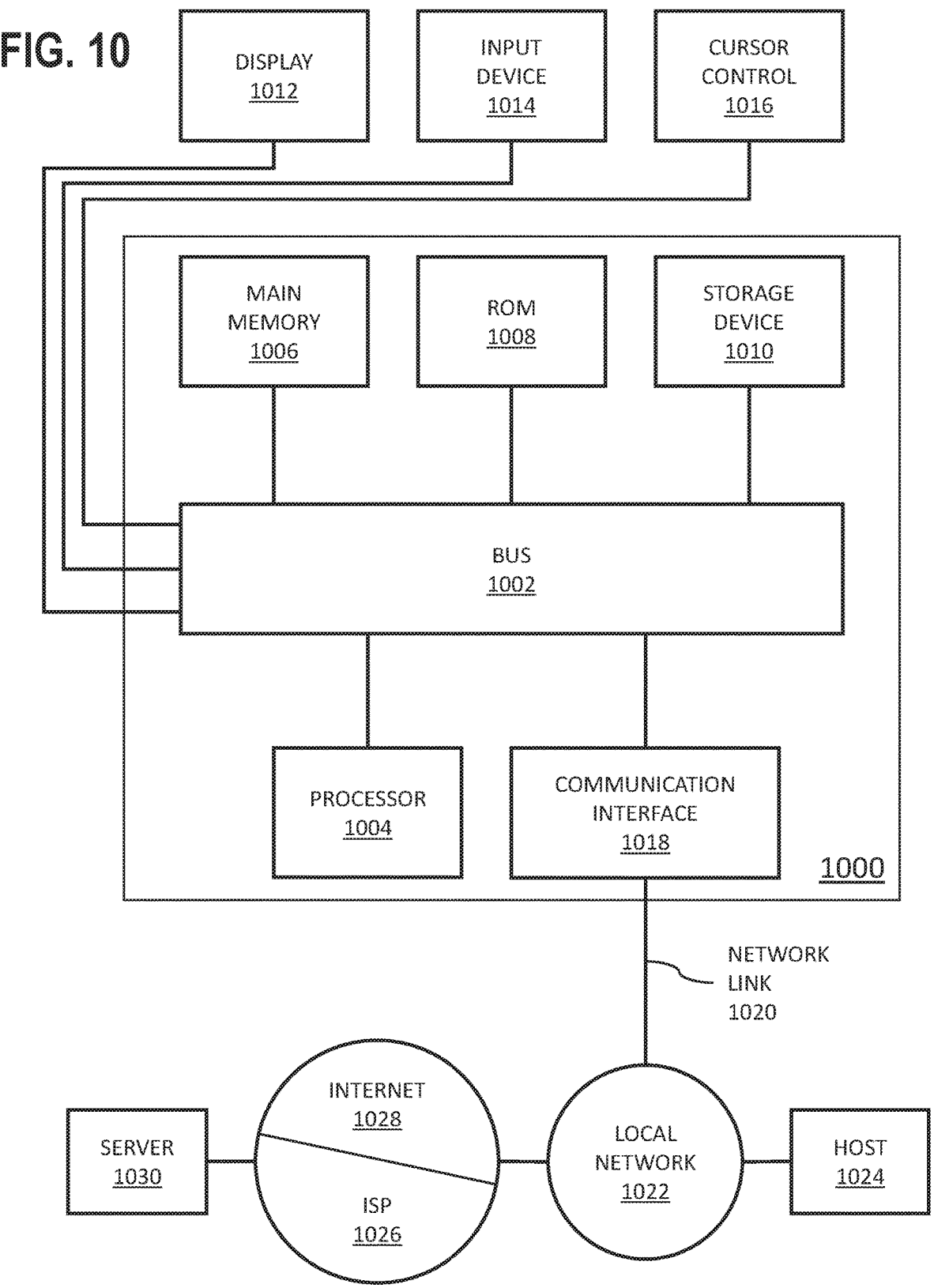
FIG. 10 shows a block diagram that illustrates a computer system in accordance with one or more embodiments.

For example, FIG. 10 is a block diagram that illustrates a computer system 1000 upon which an embodiment of the invention may be implemented. Computer system 1000 includes a bus 1002 or other communication mechanism for communicating information, and a hardware processor 1004 coupled with bus 1002 for processing information. Hardware processor 1004 may be, for example, a general purpose microprocessor.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

7. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

8. Microservice Applications

According to one or more embodiments, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally comprise a single logical executable. With microservice applications, different microservices are independently deployable as separate executables. Microservices may communicate using HyperText Transfer Protocol (HTTP) messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively or additionally provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

In one or more embodiments, microservices may be connected via a GUI. For example, microservices may be displayed as logical blocks within a window, frame, other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

Triggers

The techniques described above may be encapsulated into a microservice, according to one or more embodiments. In other words, a microservice may trigger a notification (into the microservices manager for optional use by other plugged in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects a value has crossed a triggering threshold.

In one embodiment, the trigger, when satisfied, might output data for consumption by the target microservice. In another embodiment, the trigger, when satisfied, outputs a binary value indicating the trigger has been satisfied, or outputs the name of the field or other context information for which the trigger condition was satisfied. Additionally or alternatively, the target microservice may be connected to one or more other microservices such that an alert is input to the other micro services. Other microservices may perform responsive actions based on the above techniques, including, but not limited to, deploying additional resources, adjusting system configurations, and/or generating GUIs.

Actions

In one or more embodiments, a plugged-in microservice application may expose actions to the microservices manager. The exposed actions may receive, as input, data or an identification of a data object or location of data, that causes data to be moved into a data cloud.

In one or more embodiments, the exposed actions may receive, as input, a request to increase or decrease existing alert thresholds. The input might identify existing in-application alert thresholds and whether to increase or decrease, or delete the threshold. Additionally or alternatively, the input might request the microservice application to create new in-application alert thresholds. The in-application alerts may trigger alerts to the user while logged into the application, or may trigger alerts to the user using default or user-selected alert mechanisms available within the microservice application itself, rather than through other applications plugged into the microservices manager.

In one or more embodiments, the microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, cause performance of operations comprising:
   selecting a first data set based on characteristics of a portion of a data structure (a) stored in memory and (b) comprising a plurality of allocated objects, wherein the first data set comprises a subset of the plurality of allocated objects;
   computing a first memory health metric associated with the first data set, as a function of estimated entropy in the data set, wherein computing the first memory health metric comprises:
      determining an uncompressed size of the first data set,
      determining a compressed size of the first data set, and
      computing a relationship between the uncompressed size and the compressed size;
   determining that the first memory health metric crosses a first threshold value;
   presenting, responsive to determining that the first memory health metric crosses the first threshold value, a first warning associated with the memory health metric,
   wherein the first memory health metric indicates that the data structure comprises less payload data than what would be expected for random data in a storage mechanism, and
   wherein the first memory health metric indicates that poor memory health of the data structure is at least partly attributable to the first data set.

2. The medium of claim 1, wherein determining the compressed size of the first data set comprises estimating the compressed size of the first data set.

3. The medium of claim 1, wherein computing the first memory health metric further comprises using a first compression technique for a first subset of the first data set and a second compression technique for a second subset of the first data set.

4. The medium of claim 1, wherein the first memory health metric is associated with a particular type in the first data set, and wherein presenting the first warning comprises identifying the type.

5. The medium of claim 1, the operations further comprising:
   determining the first threshold value based on one or more attributes of the first data set,
   wherein the first memory health metric indicates that poor memory health of the data structure is mostly attributable to the first data set.

6. The medium of claim 1, the operations further comprising:
   computing a second memory health metric associated with a second data set stored in the data structure;
   determining that the second memory health metric crosses a second threshold value;
   presenting, responsive to determining that the second memory health metric crosses the second threshold value, a second warning associated with the memory health metric.

7. The medium of claim 1, wherein the data structure is associated with a tenant of a cloud storage system, and wherein determining that the first memory health metric crosses the first threshold value is performed at runtime of the cloud storage system.

8. The medium of claim 1, wherein the first data set comprises a plurality of objects being managed by a virtual machine, and wherein determining that the first memory health metric crosses a first threshold value is performed at runtime of the virtual machine.

9. A non-transitory computer readable medium comprising instructions which, when executed by one or more hardware processors, cause performance of operations comprising:
   computing a first memory health metric associated with a first data set stored in a data structure in memory, as a function of estimated entropy in the data set, wherein computing the first memory health metric comprises:
      determining an uncompressed size of the first data set,
      determining a compressed size of the first data set by using a first compression technique for a first subset of the first data set and a second compression technique for a second subset of the first data set, wherein the first subset of the first data set comprises overhead associated with fields in the second subset of the first data set; and
      computing a relationship between the uncompressed size and the compressed size;
   determining that the first memory health metric crosses a first threshold value;
   presenting, responsive to determining that the first memory health metric crosses the first threshold value, a first warning associated with the memory health metric,
   wherein the first memory health metric indicates that the data structure comprises less payload data than what would be expected for random data in a storage mechanism, and
   wherein the first memory health metric indicates that poor memory health of the data structure is at least partly attributable to the first data set.

10. The medium of claim 9, wherein the first compression technique comprises discounting a size of the first subset of the first data.

11. A non-transitory computer readable medium comprising instructions which, when executed by one or more hardware processors, cause performance of operations comprising:
   computing a first memory health metric associated with a first data set stored in a data structure in memory, as a function of estimated entropy in the data set, wherein computing the first memory health metric comprises:
      determining an uncompressed size of the first data set,
      determining a compressed size of the first data set, and
      computing a relationship between the uncompressed size and the compressed size;
   determining that the first memory health metric crosses a first threshold value;

generating, responsive to determining that the first memory health metric crosses the first threshold value, a graphical user interface comprising a storage map, wherein the storage map
- (a) represents the data structure,
- (b) comprises a visual distinction between a first area of payload data and a second area of overhead data, and
- (c) indicates that the memory health metric is associated with the first data set within the data structure;

wherein the first memory health metric indicates that the data structure comprises less payload data than what would be expected for random data in a storage mechanism, and wherein the first memory health metric indicates that poor memory health of the data structure is at least partly attributable to the first data set.

12. A non-transitory computer readable medium comprising instructions which, when executed by one or more hardware processors, cause performance of operations comprising:

selecting a first data set based on characteristics of a portion of a data structure (a) stored in memory and (b) comprising a plurality of allocated objects, wherein the first data set comprises a subset of the plurality of allocated objects;

computing a memory health metric associated with the data set, as a function of estimated entropy in the data set, wherein computing the memory health metric comprises:
- determining a plurality of quantities corresponding to occurrences, respectively, of a plurality of values in the data set, and
- computing a relationship between the plurality of quantities;

determining that the memory health metric crosses a threshold value;

presenting, responsive to determining that the memory health metric crosses the threshold value, a warning associated with the memory health metric, wherein the first memory health metric indicates that the data structure comprises less payload data than what would be expected for random data in an effective a storage mechanism, and wherein the first memory health metric indicates that poor memory health of the data structure is at least partly attributable to the first data set.

13. The medium of claim 12, wherein each quantity in the plurality of quantities corresponds, respectively, to a particular range of values in the plurality of values.

14. The medium of claim 12, wherein computing the relationship between the plurality of quantities comprises computing a relative entropy value.

15. A non-transitory computer readable medium comprising instructions which, when executed by one or more hardware processors, cause performance of operations comprising:

computing a memory health metric associated with a data set stored in a data structure in memory, as a function of estimated entropy in the data set, wherein computing the memory health metric comprises identifying a pattern of pointers between a plurality of objects in the data set and determining that the plurality of objects is reducible to a simplified object without the pattern of pointers;

determining that the memory health metric crosses a threshold value;

presenting, responsive to determining that the memory health metric crosses the threshold value, a warning associated with the memory health metric, wherein the first memory health metric indicates that the data structure comprises less payload data than what would be expected for random data in a storage mechanism, and wherein the first memory health metric indicates that poor memory health of the data structure is at least partly attributable to the first data set.

16. The medium of claim 15, wherein the warning comprises a recommendation, based on the plurality of objects being reducible to the simplified object, to refactor source code of the plurality of objects.

17. The medium of claim 16, wherein the simplified type is a value type.

* * * * *

UNITED STATES PATENT AND TRADEMARK OFFICE
CERTIFICATE OF CORRECTION

PATENT NO.         : 10,747,638 B2
APPLICATION NO.    : 15/956167
DATED              : August 18, 2020
INVENTOR(S)        : Rose It is certified that error appears in the above-identified patent and that said Letters Patent is hereby corrected as shown below:

In the Drawings

On sheet 2 of 11, in FIG. 2, under Reference Numeral 200, Line 1, delete "Class Flle 200" and insert -- Class File 200 --, therefor.

On sheet 4 of 11, in FIG. 4, under Reference Numeral 402, Line 1, delete "Oper and" and insert -- Operand --, therefor.

In the Claims

In Column 31, Line 41, in Claim 12, after "data in" delete "an effective".

Signed and Sealed this
Twenty-seventh Day of April, 2021

Drew Hirshfeld
*Performing the Functions and Duties of the
Under Secretary of Commerce for Intellectual Property and
Director of the United States Patent and Trademark Office*